Dec. 20, 1932.   H. K. T. SHERWOOD ET AL   1,891,581
DISPLAY CABINET
Filed Dec. 1, 1930   3 Sheets-Sheet 2
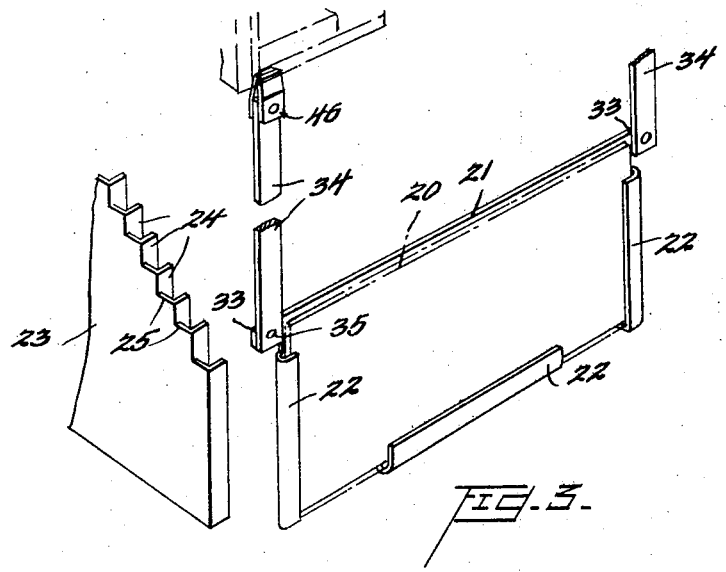
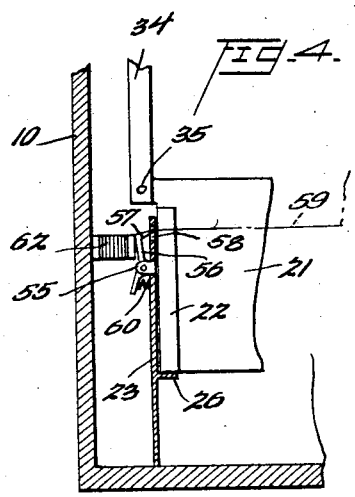
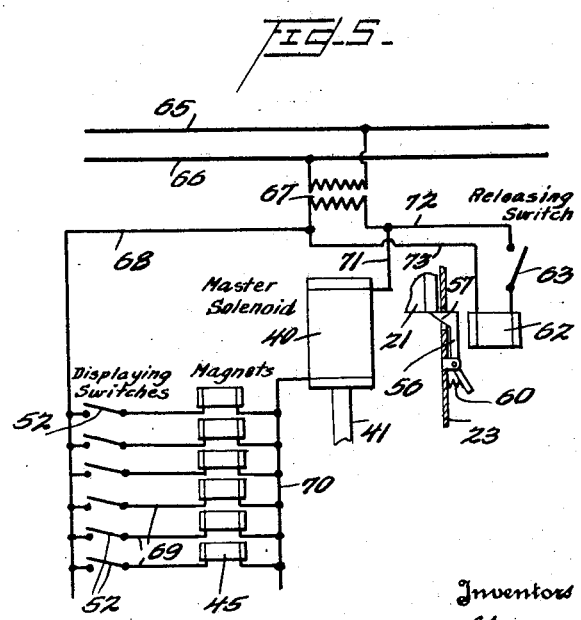

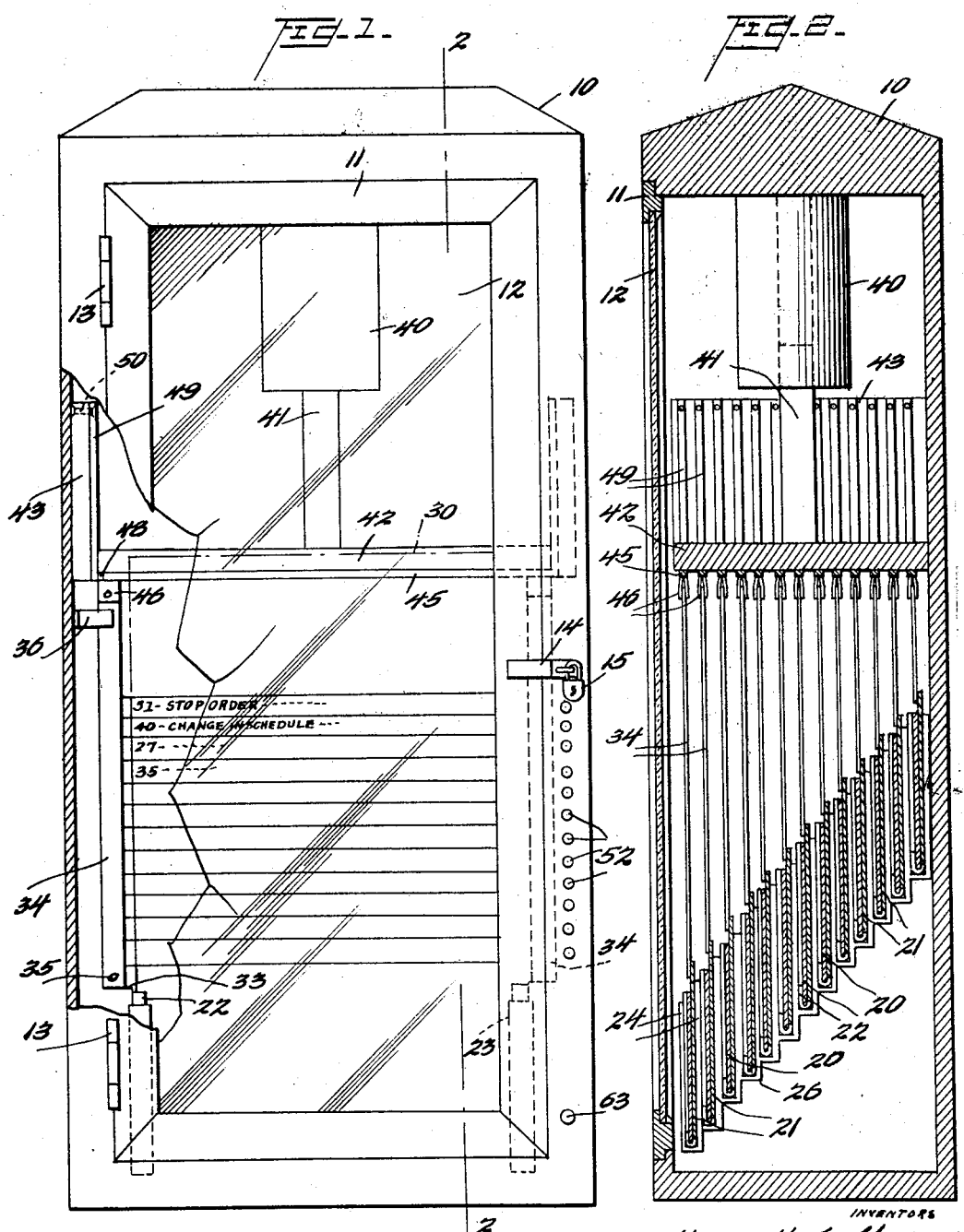

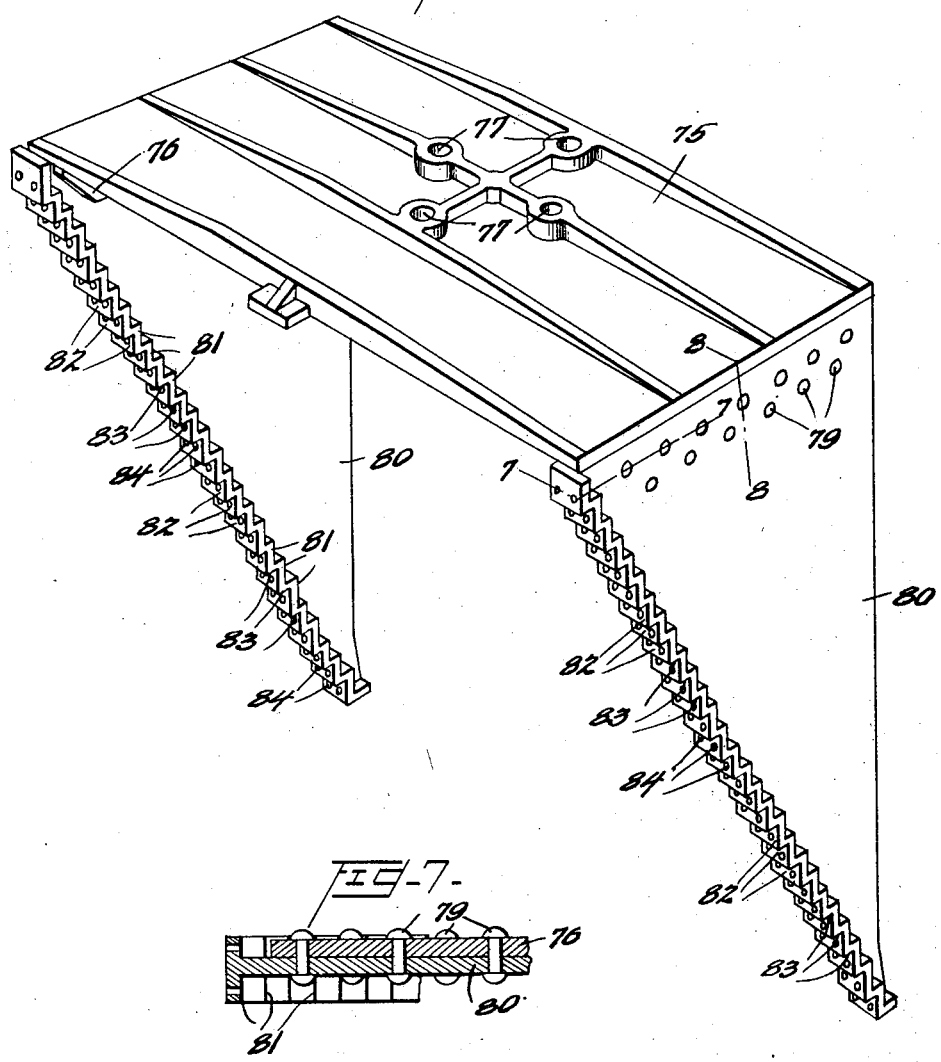

Patented Dec. 20, 1932

1,891,581

UNITED STATES PATENT OFFICE

HORACE K. T. SHERWOOD AND JOSEPH G. MOORE, OF ALBANY, NEW YORK

DISPLAY CABINET

Application filed December 1, 1930. Serial No. 499,362.

This invention relates to display devices, and more particularly to apparatus for retaining and preserving display matter of various kinds and exhibiting such matter upon actuation of mechanism associated therewith.

The embodiment comprised in the present case is a modification of the device covered by the co-pending application Serial No. 499,361, filed December 1, 1930.

The invention has for its object the provision of a receptacle or device which is especially adapted for employment in connection with the exhibiting of printed matter, mounted specimens, or the like, and which is designed to preserve the legibility of such printed matter and to prevent the defacement, theft or loss of any article adapted for display therein. A few specific and suggestive examples of the utility of our novel cabinet are as follows: the display of notices, bulletins, and orders in locomotive houses, shops, factories, garages, department stores or the like; the posting of timetables or other information in railroad stations, airports, steamship piers, or bus terminals; and, the exhibition of announcements, score tallies or similar data in golf or athletic clubs. However, the applicability of the device is not limited to the uses herein set forth, but is of a scope commensurate with that of the subjoined claims wherein the present invention is defined.

The receptacle is adapted to be locked so that only authorized persons may have access to the display matter therein but interested persons desirous of viewing any particular notice or bulletin may do so by manipulating the proper mechanism provided by the invention for exhibiting that particular item.

More specific objects of the invention are the provision of a novel mechanism for operating the exhibitor, and also the provision of a novel means for retaining the matter to be exhibited in displayed position and means for releasing said retaining means.

Other and further objects and features of novelty will be apparent from the following specification when read in connection with the accompanying drawings in which one embodiment of the invention is illustrated by way of example.

In the drawings:

Figure 1 is a view in front elevation of a display device or cabinet embodying the principles of the present invention, part of the device being shown in cross-section;

Figure 2 is a vertical cross-sectional view taken on line 2—2 of Figure 1;

Figure 3 is an exploded perspective view of a portion of the interior of the device showing one of the supporting racks and one of the display carriers which are adapted to slide therein;

Figure 4 is a vertical sectional view showing one of the detent devices for the display carriers;

Figure 5 is a wiring diagram of the electrical connections for the various operating elements of the device;

Figure 6 is a view in perspective of another embodiment of the cross head and magnet supporting structure of the cabinet;

Figure 7 is a cross-sectional view taken on line 7—7 of Figure 6; and

Figure 8 is a cross-sectional view taken on line 8—8 of Figure 6.

Referring to Figures 1 and 2 of the drawings the bulletin cabinet or receptacle is designated generally by the numeral 10 and is preferably rectangular in outline and may be of any desired proportions. The depth of the cabinet from the front to the back will depend upon the number of bulletins to be contained therein. The cabinet 10 is provided in its front face with a door 11, the greater part of which comprises a panel 12 of glass or other transparent material. The door 11 is hinged to the cabinet as at 13 and may be provided with any preferred type of locking means which may comprise, for example, a hasp 14 and padlock 15.

The bulletins, notices, specimens, or other display matter are preferably printed, mounted, or otherwise set forth upon guides or sheets 20 which are adapted to be removably supported by the carriers or frames 21, one form of which is illustrated in detail in Figure 3. The cards 20 are held in position on the carriers 21 by means of the clips 22. These carriers 21 are adapted to be slidably supported in the pair of racks 23, one of which is most clearly shown in Figure 3. Each rack 23 is preferably formed of sheet metal and is provided with the spaced partitions 24 of uniformly increasing height from front to rear of the rack. The upper edge of the rack is stepped as at 25 and stepped rest portions 26 are provided at the bottoms of the slots for supporting the lower corners of the carriers 21 when they are in their lower retracted positions. By means of mechanism to be later described, the carriers are adapted to be raised from these lower retracted positions to upper positions indicated at 30.

The cards or sheets 20 are provided with upper marginal portions 27 upon which are adapted to be displayed numbers, titles, or other identifying indicia. On account of the stepped arrangement of the rack members each one of these marginal indicia bearing portions will be exposed to the view of the operator at all times except when one or more of the forward display cards are held suspended, and it is an important feature of the present invention to provide actuating means for the exhibiting mechanism which are disposed in a definite, readily perceived relationship with the exposed indicia bearing portions of their respective sheets or cards.

In order to raise the display matter to upper fully displayed positions, the following mechanism is provided. Each of the carriers 21 are provided with a pair of lugs 33 projecting laterally from the upper portions thereof. A pair of vertically disposed rods or links 34 are secured to these lugs 33 as at 35. Any suitable means, such as lugs or projections 36, may be provided to guide the links 34 in their vertically reciprocating movement.

A solenoid coil 40 is secured to the top of the cabinet and is adapted to depend therefrom. Disposed for vertical reciprocation within the windings of the coil 40 is the core or plunger 41, upon the lower end of which is rigidly secured the cross head 42 which in the embodiment illustrated in Figures 1 and 2, is preferably rectangular in plan and is adapted to be guided in its vertical movements by means of the laterally disposed guides 43. Upon the lower face of the head 42 are disposed the narrow elongated electromagnets 45 which extend from one side to the other of the head 42 and are spaced from each other in such a manner that they are magnetically insulated from each other and the cross head and other adjacent parts. Upon the upper end of each of the links or rods 34 there is disposed an armature member 46 which may comprise two small mutually inclined strips of magnetic metal as most clearly shown in Figures 2 and 3 of the drawings. Upon the extreme outer ends of the electro-magnets 45 there is formed the contacts 48 which are adapted to slidingly engage the elongated contact strips 49 which are secured to each of the guides 43. Terminals 50 are provided at the ends of the elongated contact strips 49 to which may be secured suitable conductors for conveying electric current to the magnets 45.

In Figures 6, 7, and 8 of the drawings, there is illustrated an alternative form of cross head and magnet carrier, the use of which eliminates the links 34 and provides means for supporting magnets in stepped relation so that they may directly attract the respective upper corner lugs 33 of the card carriers 21. In this embodiment, the cross head 75 is preferably made of a light metal, such as aluminum, and is provided at each end with downwardly projecting flanges 76. Perforations 77 are provided centrally of the cross head 75 to receive suitable securing elements for the purpose of attaching the cross head to the lower end of a plunger such as illustrated at 41 in Figure 2.

To each of the flanges 76, there is secured as by means of rivets 79, for example, the substantially triangular plates 80. Each of these plates 80 is provided along its rearward diagonal edge with oppositely directed stepped flanges 81, forming alternate vertical and horizontal faces 82 and 83, respectively. Each of said vertical faces 82 (or, if desired, each of said horizontal faces 83) is perforated as at 84 for the reception of fastening elements for the purpose of securing thereto small magnets (not shown) which are adapted to perform a function similar to that of magnets 45, in lifting the card carries 21 to displayed positions. The magnets of each pair that are secured in corresponding positions upon the plates 80 and are adapted to lift a single carrier are disposed in the same electric circuit which is actuated by one of the switches 52, just as is shown in the circuit diagram in Figure 5 in the case of the single magnets 45. The electrical circuits from the stationary units to the vertically reciprocable magnets carried by the stepped plates 80 may be completed by means of sliding contacts as illustrated at 48 in connection with the embodiment first described, or by means of flexible wires.

The energizing circuit for each magnet 45 includes a switch 52 which is located upon the exterior of the cabinet 10 in close proximity to the indicia bearing portion 27 of the card which is adapted to be raised by the actuation thereof. This feature is clearly illustrated in Figure 1 of the drawings.

The electrical connections are so arranged that upon the actuation of any one or more of the magnets 45 to secure the armature 46 and thus the card carriers 21 to the head 42, the master solenoid 40 is also energized, and plunger 41 and head 42 are moved upwardly thus raising any of the card carriers which are attracted to the head 42 by means of the magnets 45.

The switches 52 are preferably of the ordinary push button type and if desired the arrangement may be such that the switch 52 must be continuously pressed to retain the display matter in raised position. However, in order to avoid the necessity of continuously actuating the switches for long periods of time, thus tending to overheat the electromagnets, the retaining device illustrated in detail in Figure 4 may be provided. In this construction the side walls of the racks 23 are provided with spaced pairs of ears 55 between which are pivoted the dogs or catches 56, the points 57 of which are adapted to enter apertures 58 in these rack walls and to engage the lower edge of the carriers 21 when they are in raised position as shown at 59 in dotted lines in Figure 4. A coil spring 60 may be provided to automatically urge the catch into engagement when the carrier 21 is moved past the point or nose 57 of the catch 56. It will thus be seen that the push button or switch 52 may be released and the selected carrier 21 will remain in displayed position until the catch 56 is released. As a means for releasing the catches 56, there is provided in each case an electro-magnet 62 which may be energized by the actuation of a master releasing switch or push button 63 for the purpose of withdrawing the catch 56 from engagement with the carrier 21.

In the wiring diagram shown in Figure 5, the current main or bus line is indicated at 65 and 66, and a step down transformer 67 may be provided in the connections leading from this main to the actuating devices of the bulletin cabinet. From one side of the secondary of this transformer, conductor 68 leads to the push buttons or switches 52. From each of these switches 52, conductors 69 lead to the magnets 45. From the opposite contacts of the magnets 45, a conductor 70 passes to the master solenoid 40 and finally the conductor 71 completes the circuit to the secondary of the transformer 67. It will readily be seen from the diagram that the actuation of any one or more of the switches 52 will cause the actuation of the master solenoid as well as the associated electro-magnet 45.

Conductors 72 and 73 serve to connect the secondary of the transformer 67 to the releasing magnets 62 and this circuit is adapted to be opened and closed by means of the releasing switch 63. Separate magnets 62 may be provided for each catch 56 or a single magnet of appropriate size and strength may be provided to actuate all of the catches 56 simultaneously.

If the occasion demands, overload relays and such contact switches as are necessary may be provided to automatically or thermally control the temperature in the master solenoid employed in this type of cabinet. Furthermore, the invention contemplates the use of two or more master coils, and a plurality of cross heads each controlling one or more bulletin carriers, instead of the single master coil device illustrated and heretofore described.

In lieu of the dog or catch mechanism for retaining the carriers 21 in their upper fully displayed position as has just been described, there may be provided a time controlled circuit breaker and associated mechanism such as is illustrated and described in the co-pending application Serial No. 499,361, filed December 1, 1930.

It is understood that various changes and modifications may be made in the embodiment which has been shown and described herein without departing from the scope of the invention as defined in the following claims.

The words "cards", "display cards", "display matter", and the like, as employed in the following claims, are to be understood as embracing any type of matter such as bulletins, charts, maps, mounted specimens, or any other material which might suggest itself as appropriate for display in a cabinet such as is disclosed herein.

Having thus described the invention, what is claimed as new and desired to be secured by Letters Patent is:

1. In a device of the class described, in combination, supporting means, a display card or the like disposed within said supporting means, and normally occupying a retracted position, means for raising said card to display position comprising a solenoid, a member adapted to be raised by said solenoid, and a magnet carried by said member and adapted to connect said card to said member.

2. In a device of the class described, in combination, a supporting means, a plurality of display cards or the like disposed within said supporting means, and normally occupying retracted positions, a master lifting means for said cards, and selectively actuated attaching means for connecting one or more of said cards to said master lifting means, whereby upon actuation of said lifting means, said card or cards may be raised to display position.

3. In a device of the class described, in combination, a supporting means, a display card or the like disposed within said supporting means, and normally occupying a retracted position, means for displaying said card comprising a cross-head, means for raising said cross-head, means for constraining the movement of said cross-head to a vertical path only and separate means for connecting said card and said cross-head at will, whereby said card will be lifted to display position upon the raising of said cross head.

4. In a device of the class described, in combination, a supporting means, a plurality of display cards or the like disposed within said supporting means, and normally occupying retracted positions, a master lifting means for said cards, and selectively actuated attaching means for connecting one or more of said cards to said master lifting means, means for selectively actuating said attaching means, and connections between said actuating means and said master lifting means whereby the latter is actuated upon each actuation of any of said attaching means.

5. In a device of the class described, in combination, a cabinet, a rack therein, display card carriers slidably mounted in said rack and normally occupying retracted positions, a portion of each card having identifying indicia thereon and being exposed to view when said cards are in retracted positions, means for selectively moving said cards to fully displayed positions, said means comprising a common lifting member for said cards, means for raising said member, means for connecting each of said cards to said member, means for selectively actuating said connecting means, each of said actuating means being disposed adjacent the indicia carrying portion of its associated card when said card is in its retracted position.

6. In a device of the class described, in combination, a cabinet, a rack in said cabinet, display card carriers slidably mounted in said rack and normally occupying retracted positions, a display card or the like disposed in each carrier, a solenoid winding, a plunger adapted to be drawn upwardly within said winding, a plurality of electro-magnets carried by said plunger, each adapted, when actuated, to attract and attach one of said carriers thereto, and selectively operable means for actuating said magnets and said solenoid.

7. In a device of the class described, in combination, a cabinet, a rack in said cabinet, a plurality of display card carriers slidably mounted in said rack and normally occupying lower retracted positions, a display card or the like mounted in each of said carriers and having an identifying indicia bearing portion adapted to be exposed to view at all times, a solenoid winding disposed within said cabinet above said rack, a core member adapted to be drawn upwardly within said winding upon energization of said winding, a plurality of electro-magnets carried by said core member, each adapted to be selectively energized to attach one of said carriers to said core member, a source of electric current, and electric circuits, each including said source of current, said solenoid winding, one of said electro-magnets and a switch, each of said switches being disposed upon the outside of said cabinet in definite relation to the indicia bearing portions of their respective associated cards.

8. In a device of the class described, in combination, a supporting means, a plurality of display cards or the like, a plurality of carriers for said cards slidably mounted in said supporting means and normally occupying lower retracted positions, means for selectively raising said cards to fully displayed positions, means for retaining said cards in said fully displayed positions comprising a spring-pressed pivoted catch associated with each of said carriers and adapted to automatically engage a portion of said carrier when the latter occupies said fully displayed position, and independently operated means for releasing said catches.

9. In a device of the class described, in combination, a supporting means, a plurality of display cards or the like, a plurality of carriers for said cards slidably mounted in said supporting means and normally occupying lower retracted positions, means for selectively raising said cards to fully displayed positions, means for retaining said cards in said fully displayed positions comprising a spring-pressed pivoted catch associated with each of said carriers and adapted to automatically engage a portion of said carrier when the latter occupies said fully displayed position, and electro-magnets for releasing said catches from engagement with said carriers.

10. In a device of the class described, in combination, a supporting means, a plurality of display cards or the like therein normally disposed in retracted positions, a lifting member for moving said cards to fully displayed positions, electro-magnetic means for raising said member, electro-magnetic means for selectively connecting said cards to said member, means for retaining said cards in said fully displayed position, and electro-magnetic means for releasing said retaining means.

11. In a device of the class described, in combination, a casing, a plurality of elements therein to be selectively raised from lower retracted positions to upper positions, a plunger, means for lifting said plunger, a plurality of electro-magnets carried by said plunger, each adapted to attract and attach one of said elements to said plunger, a plurality of contact strips on the interior of said casing, contacts on said electro-magnets adapted to slidingly engage said strips as said plunger moves in the casing, whereby electric current may be transmitted to said electro-magnets, and means for selectively actuating said electro-magnets.

12. In a device of the class described, in combination, a cabinet, a rack, a plurality of carriers for display matter slidably mounted in said rack and normally occupying lower retracted positions, display matter in each carrier, a pair of links connected to each carrier, an armature carried by the free end of each link, a plunger, a solenoid for raising said plunger, a head on said plunger, a plurality of electro-magnets secured to said head, and each adapted to attract and retain the armatures associated with one of said carriers, elongated vertical contact strips secured to the interior of said cabinet, contacts associated with each electro-magnet and adapted to slidingly engage said strips during movement of said plunger and head, switches for selectively actuating said electro-magnets and simultaneously actuating said solenoid to raise said display matter to fully exhibited position.

13. In a device of the class described, in combination, a bulletin cabinet, a plurality of display carriers slidably mounted therein and normally occupying retracted positions, a common lifting member for said carriers, electro-magnetic means for raising said member, a plurality of electro-magnets carried by said member and each adapted to attract and retain one of said carriers, a plurality of switches for selectively actuating said electro-magnets and for simultaneously actuating said solenoid, whereby one or more of said carriers may be raised to displayed position, and time controlled circuit breaking means for releasing said carriers.

14. In a device of the class described, in combination, a support, display card carriers slidably mounted in said support, and means for selectively moving said cards to displayed positions, comprising a cross head, a plate depending from said cross head and provided with a stepped portion, means carried by said stepped portion for attaching said carriers selectively thereto, and means for lifting said cross head.

15. In a device of the class described, in combination, a cabinet, a rack therein, a plurality of carriers for display matter slidably mounted in said rack and normally occupying lower retracted positions, display matter in each carrier, means for raising said carriers to fully displayed positions comprising a plunger, a solenoid for raising said plunger, a head on said plunger, a plate depending from said head, a diagonally arranged series of attaching members carried by said plate and adapted to be selectively actuated to raise one of said carriers when said plunger is raised.

16. In a device of the class described, in combination, a cabinet, a rack therein, a plurality of carriers for display matter slidably mounted in said rack and normally occupying successive rearwardly and upwardly stepped retracted positions, display matter in each carrier, means for raising said carriers to fully displayed positions comprising a plunger, a solenoid for raising said plunger, a head on said plunger, a pair of plates depending from each side of said head, each of said plates being provided with a diagonal serrated edge, a pair of stepped outwardly extending flanges formed at said edge, providing a series of attaching surfaces disposed in successive rearwardly and upwardly extending relation, an electro-magnet secured to each of said attaching surfaces and adapted to be connected in circuit with the corresponding electro-magnet on the opposite plate for attracting and retaining one of said carriers when said circuit is energized.

17. In a device of the class described, in combination, a supporting means, a plurality of display cards or the like disposed within said supporting means and normally occupying retracted positions, a master lifting means for said cards disposed above the same, means for raising said lifting means, means for constraining the movement of said lifting means to a vertical path, and selectively actuable means for connecting one or more of said cards to said lifting means whereby upon actuation of said lifting means said card or cards may be raised to display position.

18. In a device of the class described, in combination, supporting means, a display card or the like disposed within said supporting means, and normally occupying a retracted position, means for raising said card to display position comprising an electro-magnet, a member adapted to be raised by said electro-magnet, and a second magnet carried by said member and adapted to connect said card to said member.

19. In a device of the class described, in combination, a supporting means, a plurality of display cards or the like disposed within said supporting means and normally occupying retracted positions, a master lifting means for said cards, and selectively actuable means for operatively connecting one or more of said cards to said master lifting means whereby, upon actuation of said lifting means, said card or cards may be raised to display position.

20. In a device of the class described, in combination, a cabinet, a plurality of display card carriers movably mounted in said cabinet and normally occupying retracted positions, a display card or the like disposed in each carrier, a solenoid winding, a plunger adapted to reciprocate within said winding upon energization of the latter, and selectively actuable means for operatively connecting one or more of said carriers with said plunger whereby, upon reciprocation of said plunger, the selected carrier or carriers will be moved to and from fully displayed position.

21. In a device of the class described, in combination, a cabinet, a plurality of display card carriers movably mounted in said cabinet and normally occupying retracted positions, a display card or the like disposed in each carrier, a solenoid winding, a plunger adapted to reciprocate within said winding upon energization of the latter, and selectively actuable electro-magnetic means for operatively connecting one or more of said carriers with said plunger whereby, upon reciprocation of said plunger, the selected carrier or carriers will be moved to and from fully displayed position.

In testimony whereof we hereunto affix our signatures.

HORACE K. T. SHERWOOD.
JOSEPH G. MOORE.